Figure 1:
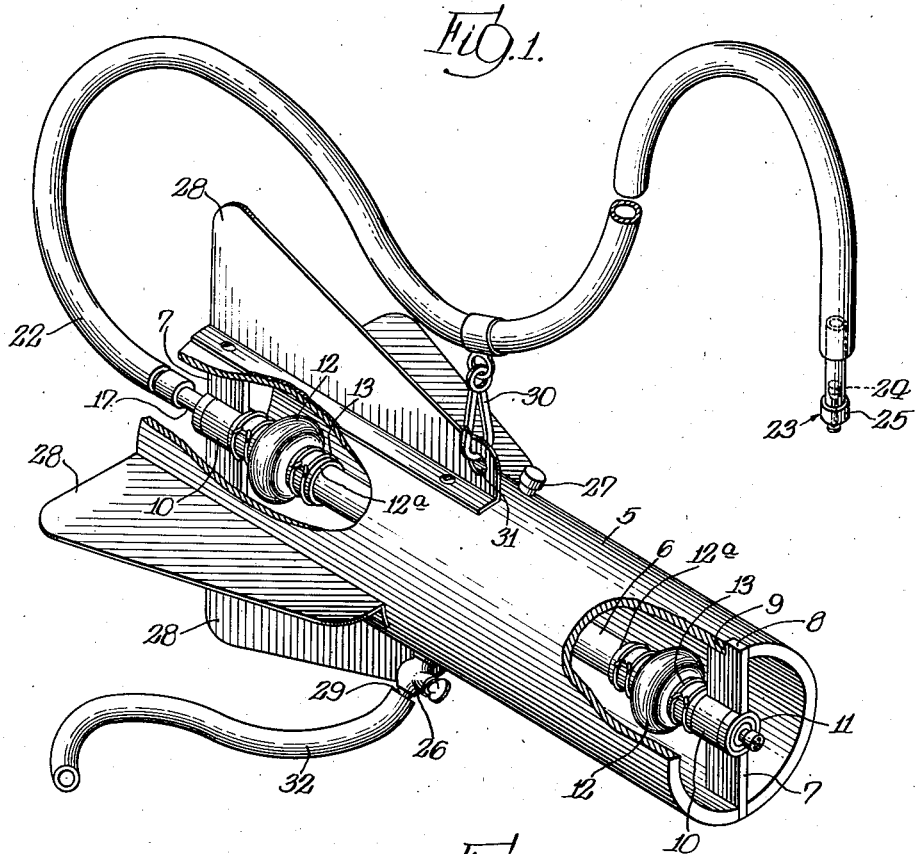

Oct. 13, 1942.    C. E. DAVIDSON, JR    2,298,350
LIQUID SAMPLING DEVICE
Filed Nov. 20, 1939

INVENTOR.
Charles E. Davidson Jr.,
BY
ATTORNEYS.

Patented Oct. 13, 1942

2,298,350

UNITED STATES PATENT OFFICE 2,298,350

LIQUID SAMPLING DEVICE

Charles E. Davidson, Jr., Lincoln, Nebr.

Application November 20, 1939, Serial No. 305,231

9 Claims. (Cl. 137—18)

My invention relates to sampling devices and it has to do particularly with a device adapted for collecting and segregating predetermined samples from a body of liquid material, which device is well suited for use in the operation of sewage disposal and water treatment plants, in the making of stream surveys, and in every other instance where it is desired to sample the liquid in its normal condition.

One of the objects of my invention is to provide a liquid sampling device which is simple in construction, is inexpensive to manufacture, is easy to operate, and which serves its intended purpose in a highly efficient manner.

Other and more specific objects are to provide a sampling device by which predetermined liquid samples may be taken from either still or flowing bodies of liquid; to provide a device of the foregoing character by which samples may be taken at any desired depth with a minimum of stirring action in or agitation of the liquid body being sampled, the arrangement being such that the sample may be taken at a particular depth in a condition unaffected by the liquid at other depths; to provide for the taking and preserving of a sample without subjecting it to the air or other external influences; to provide for the transfer of the sample or a portion thereof from the device with a minimum of agitation so that the sample may be subjected to test in a condition truly representative of that normally existing at the depth from which it is taken; and to provide a sampling device by which the foregoing advantages may be attained in the sampling of liquids having a wide range of consistency.

Other objects and advantages will become apparent as this description progresses and by reference to the drawing wherein—

Figure 2:
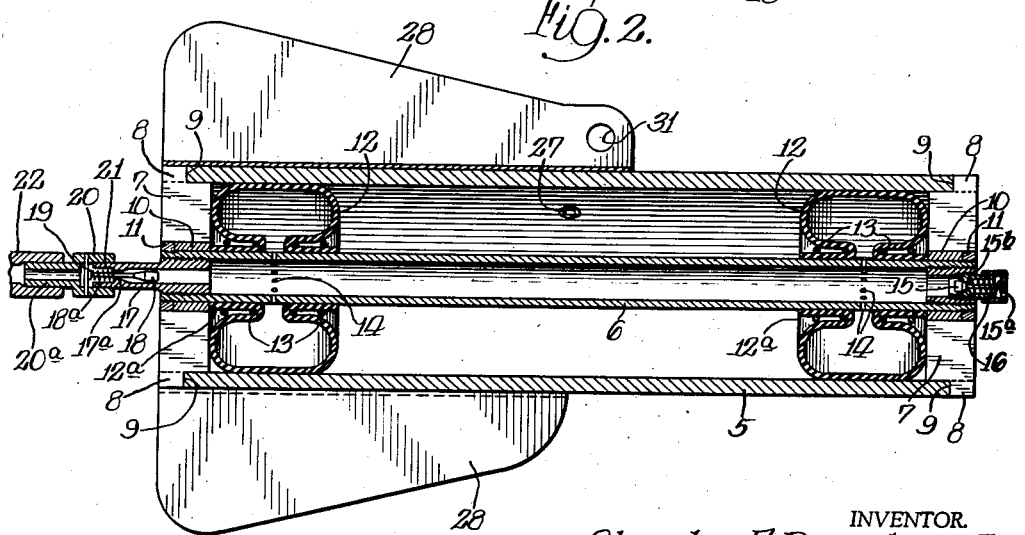

Figure 1 is a perspective view, partially in section, of one form of sampling device embodying my invention; and Fig. 2 is a vertical longitudinal section through the structure shown in Fig. 1.

The structure that I have chosen to illustrate my invention takes the form of an outer cylindrical and open-ended casing 5 formed preferably of metal. The casing 5 serves as a liquid container, the arrangement being such that the opposite ends of the same may be opened and closed to receive and retain a sample of a liquid.

To the foregoing end, I employ a small, inner and rigid tube 6 formed preferably of metal and disposed concentrically within the casing 5. The tube 6 is supported at its opposite ends by crossbars 7 carried by the ends of the casing 5. More particularly, the casing 5, at its opposite ends, is provided with a pair of diametrically opposed slots 8 of less depth than the width of the supporting bars 7. The opposite ends of the supporting bars are notched at 9 so that the opposite ends of such bars may be received in the notches 8 with the outer edges of the bars flush with the opposite end walls of the casing 5. The bars 7 are provided with central hubs 10 formed integrally therewith, or otherwise, which hubs are of less length than the width of the bar 7 and they are of such diameter that they snugly receive and support the opposite ends of the tube 6. The opposite ends of the tube 6 are externally threaded and they are of sufficient length to extend slightly beyond the outer ends of the hubs 10 for reception of threaded retaining rings 11 which, when applied, abut the outer ends of the hubs and securely fasten together the tube 6, bars 7 and casing 5 as a unit, as clearly shown in Fig. 2.

The tube 6, at its opposite ends just inwardly of the bars 7, is provided with continuous, annular, inflatable tube members 12 formed of rubber or other suitable material of such character that they may be inflated upon the application of a fluid pressure thereto and they self-collapse and become deflated when the fluid pressure is exhausted therefrom. The members 12 are so located and arranged that when they are deflated they permit the entry of liquid into the casing 5, and when they are inflated they trap any liquid that is disposed within such casing. The member 12 extends entirely around the tube 6 and it is provided with spaced-apart bottom walls 12a that are seated upon the tube 6 and secured thereto in airtight fashion by clips 13. The tube 6, at a point intermediate the bottom walls 12a of such members, is provided with a plurality of openings 14 connecting the interior of the tube 6 with the interior of the members 12.

The outermost end of the tube 6 is normally closed by a valve 15 (Fig. 2) which is mounted in the outward end of the tube 6. A spring 16 acting on an exposed cap 15a connected to the stem of the valve 15 constantly urges the valve 15 into a closing position against its seat 15b. The valve 15 may be opened, thereby venting the tube 6 by depressing the cap 15a in opposition to the spring 16.

The opposite end of the tube 6 is provided with a valve unit including a threaded nipple 17 screwed into the tube 6 and having a valve seat 17a upon which a valve 18 is adapted to seat. The valve 18 has a stem 18a that projects slightly beyond the nipple 17 where it is engaged by a pin 19 carried by a hose coupling 20 fitted upon the outer end of the nipple 17. When the valve stem is so engaged, it is moved inwardly against a nipple-carried spring 21 confined between the valve seat 18a and the outer end of the valve stem and constantly urging the valve to a closed position. The coupling 20 is secured to one end of a hose 22, the arrangement being such that the mere coupling of the hose 22 to the tube 6 opens the valve 18 so that fluid pressure may be admitted to the tube and members 12 and detachment of hose 22 results in closing of the valve by its spring 21. The opposite end of the hose 22 is provided with a valved fitting 23 which is adapted to be connected with a suitable hand pump or other means (not shown) for supplying air or other fluid pressure for inflating the devices 12. The valve fitting 23 may be of an ordinary form including a valve 24 adapted normally to assume a closed position except when a certain pressure is exerted thereagainst by the fluid pressure supply means. The valve fitting 23 also includes an exterior depressible ring, or the like, 25 by which the valve may be opened to vent the hose 22 at any desired time, as when the casing 5 is submerged.

The casing 5 is provided with a liquid discharge valve 26 and an air inlet valve 27. The valve 27, preferably, takes the same form as the valve 15, while the vale 26 may be any ordinary drain cock having a hose nipple 29 at its discharge end. The casing 5 is also provided with a plurality of (preferably, but not necessarily, four) radially extending and oppositely located fins 28 at one end thereof and extending longitudinally for stabilizing purposes in that they aid in holding the casing in a desired vertical or horizontal position within the body of the liquid with a minimum of agitating movement. In case of flowing streams, it may be desirable to insert the device in the body of the stream in horizontal position. This is accomplished through the hose 22 by mounting thereon at a point spaced from the casing 5 a snap catch 30 adapted to engage an opening 31 in the uppermost fin 28, which connection is disposed substantially midway between the ends of the casing 5. In inserting the device in a still body of liquid, as in a tank or the like, the snap connection 30—31 may be disconnected so that the casing 5 is suspended in vertical position and is deposited in the body of the liquid by means of the supporting hose 22.

In the use of the structure, assuming that a sample of liquid is to be taken from a flowing stream, the hose snap 30 is latched to the fin opening 31 so that the casing will assume a horizontal position when suspended by the hose 22. The valve 15 is temporarily opened to completely deflate the closure devices 12 and to permit casing 5 to completely drain. The end of hose 22 having the valve fitting 23 is connected to an air compressor or the like (not shown) and, after tightly closing the valves 15 and 27 and the drain valve 26, the casing 5 is lowered into the body of the liquid to the desired depth. After the device has been submerged for a sufficient time for the material flowing therethrough to assume the natural condition of the liquid at that depth, air or other fluid is forced through the hose 22 to tube 6 and thence through the openings 14 in the devices 12. The devices 12 are expanded to engage the inner wall of the casing 5 under pressure, as shown in Fig. 2, and they are expanded in such a way as to not only trap the segregated liquid in airtight fashion, but to also place the segregated liquid under a slight pressure, thereby tending to prevent the seepage of air into the casing in contact with the liquid.

The casing 5 with the trapped liquid is then raised by means of the hose 22 and the hose coupling 20 is detached. In detaching the hose 22, the valve 17 closes so that the casing 5 with the liquid trapped therein is in condition to be handled and transported to any desired place for testing of the collected sample. In sampling a still body of liquid, the device is cleared of any previous material, the hose snap 30 is detached from opening 31 so that the casing will be suspended vertically by the hose 22, and the devices 12 are initially inflated to the condition shown in Fig. 2 in the manner above described. After the device is thus conditioned, it is lowered into the material to the desired depth. When this has been accomplished, the valve fixture 23 is actuated to vent air from the devices 12 through the hose 22, thereby deflating such devices and permitting the space within the casing 5 between the devices 12 to fill with the liquid at that particular depth. The material tends to enter at the bottom of the casing, forcing air from the casing 5 through the upper end thereof so that the casing completely fills with the liquid in a condition truly representative of the liquid at that particular depth. As soon as the casing has become filled, air is again forced through the hose 22 to inflate the members 12 as above described, thereby trapping the sample secured. The separated sample is then removed from the liquid body, the sample thus segregated being sealed apart from the air or other external agencies that might influence the same, as described in taking a sample from a flowing stream.

In either of the foregoing cases, the selected sample may be tested in part or as a whole immediately or preserved for a desirable length of time for test purposes. The device may also be transported from place to place with the segregated sample without spilling or in any way changing the physical or biological structure of the same so that it may be tested in a truly representative condition. More particularly, when the sample is to be tested, a drainage hose 32 is connected to the valve nipple 29 for conveniently controlling the discharge of the material into a test receptacle. The valve 26 is then opened, permitting the discharge of a small amount of the material due to the fact that it is confined under pressure by the inflated members 12. To effect further and free discharge of the material, the air valve 27 is opened, admitting air to the interior of the casing 5, thereby permitting the material to flow through the valve 26 and hose 32 in a manner well understood. All or part of the sample may be drained by properly manipulating the valves 26 and 27.

I believe that the operation and advantages of my invention will be understood from the foregoing description. It fills a distinct need in the operation of sewage disposal plants and water treatment plants, and in the making of stream surveys. By way of illustration, it is quite important in the handling of sewage that the nature of liquids at various depths be accurately determined; for example, the thickness of the sludge blanket in clarifiers, the supernatant levels in sludge digestors and overage samples of tank contents by compositing groups of samples taken at different depths. With this invention, samples may readily be taken which are suitable for determining the dissolved oxygen content of the liquid, samples suitable for biochemical oxygen demand tests may readily be taken, as well as samples suitable for hydrogen sulphide content tests. All of the foregoing advantages are facilitated by obtaining a sample out of contact with the air and by preserving it out of contact with the air until a test is to be made.

I claim:

1. A liquid sampling device comprising an elongated tubular casing normally open at its opposite ends, inflatable and deflatable members mounted in the opposite ends of said casing for opening and closing the same, means maintaining said members in substantially concentric relation with said casing, means through which fluid pressure is applied to said members to inflate the same, and means for exhausting fluid pressure from said members to deflate the same.

2. A liquid sampling device comprising an elongated tubular casing normally open at its opposite ends, inflatable and deflatable members mounted in the opposite ends of said casing for opening and closing the same, means through which fluid pressure is applied to said members to inflate the same, means for exhausting fluid pressure from said members to deflate the same, and means for draining liquid from said casing intermediate said members while said members are in an inflated and casing-closing position.

3. A liquid sampling device which comprises an elongated tubular casing open at its opposite ends, a rigid tubular conduit in said casing and extending from end to end thereof, means connected with said conduit and casing maintaining said conduit in substantially concentric relation with said casing, tubular inflatable and collapsible members surrounding said conduit within said casing at the opposite ends thereof, said conduit having openings therein leading into said members, means for closing one end of said conduit, and a flexible conduit connected to the other end of said tubular conduit for admitting fluid pressure to the latter and to said members for inflating the same to close the ends of said casing.

4. A liquid sampling device which comprises an elongated tubular casing open at its opposite ends, a rigid tubular conduit mounted concentrically within said casing and extending from end to end thereof, tubular inflatable and collapsible members surrounding said conduit within said casing at opposite ends thereof, said conduit having openings therein leading into said members, valve means for closing one end of said conduit, a flexible conduit connected to the other end of said tubular conduit for admitting fluid pressure to the latter and to said members for inflating the same to close the ends of said casing, and means for withdrawing liquid from said casing while said members are inflated.

5. A liquid sampling device which comprises an elongated tubular casing open at its opposite ends, a rigid tubular conduit in said casing and extending from end to end thereof, means connected with said conduit and casing maintaining said conduit in substantially concentric relation with said casing, tubular members extending around and secured to the opposite ends of said conduit, said conduit having openings therein leading into said tubular members and said tubular members being so constructed and arranged that they are inflatable to close the casing upon the application of fluid pressure thereto and they are self-collapsible when fluid pressure is exhausted therefrom, means for closing one end of said conduit, and means connected to its other end by which fluid pressure may be applied thereto for inflating said tubular members.

6. A liquid sampling device comprising an elongated tubular casing open at its opposite ends and adapted to contain a sample of liquid, a tubular member in said casing, means connected with said conduit and casing maintaining said conduit in substantially concentric relation with said casing, tubular devices inflatable and self-collapsible in character mounted on the opposite ends of said tubular member within said casing and adapted when inflated to engage the casing wall and close the ends thereof so as to retain therebetween a collected sample of liquid, said tubular member having openings leading into said inflatable devices, valves in the opposite ends of said tubular member and so constructed and arranged that they are constantly urged toward closed position, a fluid pressure conduit connected to one end of said tubular member, and means associated with said fluid pressure conduit for holding the valve in the connected end of said tubular member open when such conduit is applied thereto.

7. A liquid sampling device comprising an elongated tubular casing open at its opposite ends and adapted to contain a sample of liquid, a tubular member mounted concentrically within said casing, tubular devices inflatable and self-collapsible in character mounted on the opposite ends of said tubular member within said casing and adapted when inflated to engage the casing wall and close the ends thereof so as to retain a collected sample of liquid, said tubular member having openings leading into said inflatable devices, valves in the opposite ends of said tubular member and so constructed and arranged that they are constantly urged toward closed position, a fluid pressure conduit connected to one end of said tubular member, means associated with said fluid pressure conduit for holding the valve in the connected end of said tubular member open when such conduit is applied thereto, and means carried by said casing for discharging liquid therefrom when said inflatable devices are inflated.

8. A liquid sampling device comprising a casing normally open at its opposite ends, fluid pressure operated means for closing the opposite ends of said casing to trap a liquid therewithin, means through which fluid pressure is supplied to said means and which serves normally to support said casing in vertical position for inserting it within and withdrawing it from a body of liquid, and means carried by said fluid pressure supply means at a point removed from the end of said casing and engageable with the exterior of said casing at a point midway its length for supporting the latter in a horizontal position.

9. A liquid sampling device comprising a casing normally open at its opposite ends, fluid pressure operated means for closing the opposite ends of said casing to trap a liquid therewithin, means through which fluid pressure is supplied to said means and which serves normally to support said casing in vertical position for inserting it within and withdrawing it from a body of liquid, means carried by said fluid pressure supply means at a point removed from the end of said casing and engageable with the exterior of said casing at a point midway its length for supporting the latter in a horizontal position, and radially disposed stabilizing fins on an exterior end portion of said casing.

CHARLES E. DAVIDSON, JR.